United States Patent [19]
Stolzer et al.

[11] 3,895,108
[45] July 15, 1975

[54] INSECTICIDAL USE OF O-(2-BROMOETHYL)-O-(2,-DICHLOROVINYL)-PHOSPHORIC ACID ESTERS

[75] Inventors: Claus Stolzer, Wuppertal-Vohwinkel; Wolfgang Behrenz, Cologne, both of Germany

[73] Assignee: Bayer Aktiengesellschaft, Leverkusen, Germany

[22] Filed: Nov. 19, 1973

[21] Appl. No.: 417,432

Related U.S. Application Data

[60] Continuation of Ser. No. 202,666, Nov. 26, 1971, abandoned, which is a division of Ser. No. 886,773, Dec. 19, 1969, abandoned.

Foreign Application Priority Data

[30] Dec. 24, 1968 Germany............................ 1816903

[52] U.S. Cl. ................................................ 424/219
[51] Int. Cl.² ............................................ A01N 9/36
[58] Field of Search...................... 424/219; 260/969

[56] References Cited
UNITED STATES PATENTS 2,927,122  3/1960  Schrader............................. 260/957
2,956,073  10/1960  Whetstone et al.................. 260/957

FOREIGN PATENTS OR APPLICATIONS 1,232,961  1/1967  Germany ........................... 260/957

*Primary Examiner*—Albert T. Meyers
*Assistant Examiner*—Norman A. Drezin
*Attorney, Agent, or Firm*—Burgess, Dinklage & Sprung

[57] ABSTRACT

Reacting 2-(alkoxy, alkylphenoxy, alkylmercapto, dialkylamino, dialkenylamino and 1'-alkyl-2'-alkoxy carbonylvinyloxy)-4-(optionally alkyl, haloalkyl and alkenyloxyalkyl substituted)-1,3,2-dioxaphospholanes with bromo-dichloroacetaldehyde, optionally in the presence of an inert diluent or organic solvent, for example at a temperature of about 0-100°C, to form the corresponding 0-[2-bromo-1-(optionally alkyl, haloalkyl and alkenyloxyalkyl substituted)-ethyl]-0-(2',2'-dichloro-vinyl)- [0-(alkyl and alkylphenyl)-phosphoric acid esters; S-(alkyl)-thiolphosphoric acid esters; and N,N-(dialkyl and dialkenyl)-phosphoric acid amides], some of which are new compounds and all of which possess insecticidal properties.

3 Claims, No Drawings

INSECTICIDAL USE OF O-(2-BROMOETHYL)-O-(2-DICHLORO-VINYL)-PHOSPHORIC ACID ESTERS

This is a continuation of application Ser. No. 202,666, filed Nov. 26, 1971, now abandoned, which was a division of application Ser. No. 886,773, filed Dec. 19, 1969, now abandoned.

The present invention relates to and has for its objects the provision for particular new methods of reacting 2-(alkoxy, alkylphenoxy, alkylmercapto, dialkylamino, dialkenylamino and 1′-alkyl-2′-alkoxy carbonyl-vinyloxy)-4-(optionally alkyl, haloalkyl and alkenyloxy-alkyl substituted)-1,3,2-dioxaphospholanes with bromodichloroacetaldehyde, optionally in the presence of an inert diluent or organic solvent, for example at a temperature of about 0°–100°C, to form the corresponding 0-[2-bromo-1-(optionally alkyl, haloalkyl and alkenyloxyalkyl substituted)-ethyl]-0-(2′,2′-dichloro-vinyl)- [0-(alkyl and alkylphenyl)-phosphoric acid esters; S-(alkyl)-thiolphosphoric acid esters; and N,N-(dialkyl and dialkenyl)-phosphoric acid amides], some of which are new compounds and all of which possess insecticidal properties, i.e. in a simple overall single step reaction, using readily available starting materials whereby to attain outstanding yields and high purity, with other and further objects of the invention becoming apparent from a study of the within specification and accompanying examples.

From German Patent 968,486, it is known that 2-substituted dioxaphospholanes can be reacted with chloral via a ring splitting mechanism to give 0-(2-chloro-ethyl)-0-(2,2-dichloro-vinyl-phosphoric acid derivatives.

Furthermore, in German Published Patent (D.A.S.) 1,232,961, there is already described a process for the preparation of esters of some acids of phosphorus which leads, among other things — but in a completely different way — to certain known 0-(2-bromo-ethyl)-0-(2,2-dichlorovinyl)-0-methyl-phosphoric acid esters, some of which are embraced by formula (Ia) below.

It has now been found, in accordance with the present invention, that a versatile and smooth process may now be provided for the production in favorable yields and high purity of the analogously structured 0-(2-bromo-ethyl)-0-(2,2-dichloro-vinyl)-phosphoric acid compounds, some of which are new compounds and all of which possess insecticidal properties, of the formula

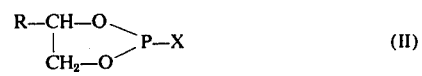

in which
R is hydrogen, alkyl of 1–4 carbon atoms, haloalkyl of 1–4 carbon atoms, or alkenoxyalkyl having 2–5 carbon atoms in the alkenyoxy moiety and 1–4 carbon atoms in the alkyl moiety, and
X is alkoxy of 1–4 carbon atoms, alkylphenoxy having 1–4 carbon atoms in the alkyl moiety, alkylmercapto of 1–4 carbon atoms, dialkylamino having 1–4 carbon atoms in each alkyl moiety, dialkenylamino having 2–4 carbon atoms in each alkenyl moiety, or 1-alkyl-2-alkoxycarbonyl-vinyloxy having 1–4 carbon atoms in the alkyl moiety and 1–4 carbon atoms in the alkoxy moiety, which comprises reacting 1,3,2-dioxaphospholanes of the formula

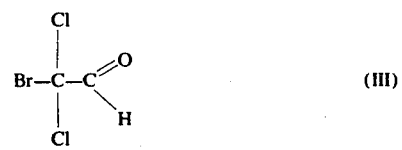

in which
R and X are the same as defined above, with bromodichloroacetaldehyde of the formula $$\begin{array}{c} Cl \\ | \\ Br-C-C \overset{O}{\underset{H}{\diagup}} \\ | \\ Cl \end{array} \quad (III)$$

to form the corresponding 0-(2-bromo-ethyl)-0-(2,2-dichlorovinyl)-phosphoric acid compound.

In this connection, it is most surprising and unexpected that only the bromine atom causes the splitting of the dioxaphospholane ring and enters the newly formed side-chain. Since chloral, as stated in German Patent 968,486 mentioned above, brings about the ring splitting described with the same ease in exothermal reaction, it was to have been expected that the use of bromodichloroacetaldehyde [(Br)(Cl)₂C-CHO] instead of chloral [(Cl)₃C-CHO] would give a mixed product in which bromine and chlorine atoms would be distributed statistically between the haloalkyl and dihalovinyl groups. This, however, is not the case. The final products of the process according to the present invention are all homogeneous and specifically correspond to formula (Ia) above, as can be proved for example by nuclear resonance spectroscopy. Thus, the production process according to the present invention, measured against the prior art, represents a distinct, surprising and valuable advance.

If, for instance, 2-methoxy-1,3,2-dioxaphospholane and bromodichloroacetaldehyde are used as starting materials, the reaction course, can be represented by the following typical formula scheme:

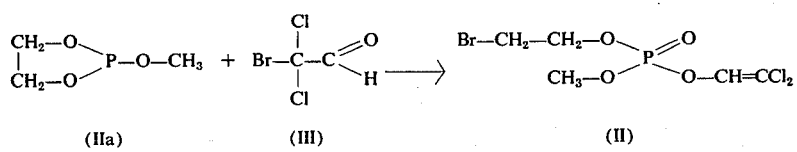

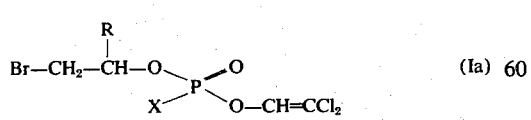

The 1,3,2-dioxaphospholanes which may be used as starting materials according to the present invention are clearly characterized by formula (II) above.

Advantageously, in accordance with the present invention, in the various formulae herein:

R represents hydrogen;

straight and branched chain lower alkyl hydrocarbon of 1–4 carbon atoms such as methyl, ethyl, n- and iso- propyl, n-, iso-, sec.- and tert.-butyl, and the like, and especially $C_{1-3}$ or $C_{1-2}$ alkyl;

straight and branched chain halo lower alkyl of 1–4 carbon atoms such as chloro, bromo, iodo and fluoro, preferably chloro, substituted methyl to tert.-butyl inclusive as defined above, and the like, including chloromethyl, 2-chloro-ethyl, and the like, especially chloro-$C_{1-4}$ or $C_{1-3}$ or $C_{1-2}$ alkyl, and more especially chloromethyl and straight and branched chain lower alkenyloxy-lower alkyl having 2–5 carbon atoms in the alkenyloxy moiety and 1–4 carbon atoms in the alkyl moiety such as vinyloxy, $\alpha$-, $\beta$- and $\gamma$-allyloxy (i.e. prop-2-enyloxy, 1-methyl-vinyloxy and prop-1-enyloxy), but-1,2 and 3-enyloxy, 1 and 2-methylprop-1 and 2-enyloxy, 1 and 2-ethyl-vinyloxy, 1,2-dimethylvinyloxy, pentenyloxy, and the like, - methyl to tert.-butyl inclusive as defined above, and the like, especially $C_{2-5}$ or $C_{2-4}$ or $C_{3-4}$ or $C_3$ alkenyloxy-$C_{1-3}$ or $C_{1-2}$ alkyl, more especially $C_{2-4}$ or $C_{3-4}$ alkenyloxy-methyl, and most especially allyloxymethyl, e.g. $\gamma$-allyloxymethyl or prop-2-enyloxymethyl;

X represents straight and branched chain lower alkoxy of 1–4 carbon atoms such as methoxy, ethoxy, n- and isopropoxy, n-, iso-, sec.- and tert.-butoxy, and the like, and especially $C_{1-3}$ or $C_{1-2}$ alkoxy;

straight and branched chain lower alkyl-phenoxy having 1–4 carbon atoms in the alkyl moiety such as methyl to tert.-butyl inclusive as defined above, and the like, -phenoxy, and especially tert.-butyl-phenoxy.

straight and branched chain lower alkylmercapto of 1–4 carbon atoms such as methyl to tert.-butyl inclusive as defined above, and the like, -mercapto, and especially $C_{1-3}$ or $C_{1-2}$ alkylmercapto;

di lower alkyl amino having 1–4 carbon atoms in each alkyl moiety such as di (same and mixed) methyl to tert.-butyl inclusive as defined above, and the like, -amino, and especially di $C_{1-3}$ or $C_{1-2}$ alkyl-amino;

di lower alkenylamino having 2–4 carbon atoms in each alkenyl moiety such as di (same and mixed) vinyl, $\alpha$-, $\beta$- and $\gamma$-allyl (i.e. prop-1-enyl, 1-methyl-vinyl and prop-2-enyl), but-1,2 and 3-enyl, 1 and 2-methyl-prop- 1 and 2-enyl, 1 and 2-ethyl-vinyl, 1,2-dimethyl-vinyl, and the like, -amino, especially di $C_{3-4}$ or $C_3$ alkenyl-amino, and more especially di $C_3$ alkenyl-amino or di-allyl-amino, e.g. di-$\gamma$- allyl-amino or di-prop-2-enyl-amino; and 1-lower alkyl-2-lower alkoxy-carbonyl-vinyloxy having 1–4 carbon atoms in the alkyl moiety and 1–4 carbon atoms in the alkoxy moiety, i.e. 1-($C_{1-4}$ alkyl)-2-($C_{1-4}$ alkyl-

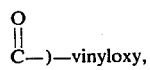

—)—vinyloxy, such as 1-methyl to tert.-butyl inclusive as defined above, and the like, -2-methoxy to tert. -butoxy inclusive as defined above, and the like, -carbonyl- vinyloxy, especially 1-($C_{1-3}$ or $C_{1-2}$ alkyl)-2-($C_{1-3}$ or $C_{1-2}$ alkoxy-carbonyl)-vinyloxy, i.e. 1-($C_{1-3}$ or $C_{1-2}$ alkyl)-2-(carbo-$C_{1-3}$ or $C_{1-2}$ alkoxy)-vinyloxy, and more especially 1-methyl-2-ethoxycarbonyl-vinyloxy.

Preferably, R is hydrogen; or $C_{1-3}$ or $C_{1-2}$ alkyl; or chloro-$C_{1-4}$ or $C_{1-3}$ or $C_{1-2}$ alkyl; or $C_{2-4}$ or $C_{3-4}$ alkenyloxy-$C_{1-3}$ or $C_{1-2}$ alkyl; and X is $C_{1-4}$ or $C_{1-3}$ or $C_{1-2}$ alkoxy; or $C_{1-4}$ alkyl-phenoxy; or $C_{1-3}$ or $C_{1-2}$ alkylmercapto; or di $C_{1-3}$ or $C_{1-2}$ alkyl-amino; or di $C_{3-4}$ alkenyl-amino; or 1-($C_{1-3}$ or $C_{1-2}$ alkyl)-2-(carbo-$C_{1-3}$ or $C_{1-2}$ alkoxy)-vinyloxy.

In particular, R is hydrogen; or $C_{1-2}$ alkyl; or chloro-$C_{1-2}$ alkyl; or $C_{2-4}$ alkenyloxy-methyl; and X is $C_{1-4}$ alkoxy; or $C_{1-4}$ alkyl-phenoxy; or $C_{1-4}$ alkylmercapto; or di $C_{1-2}$ alkyl-amino; or di $C_{3-4}$ alkenyl-amino; or 1-($C_{1-2}$ alkyl)-2-(carbo-$C_{1-3}$ alkoxy)-vinyloxy.

As examples of the 1,3,2-dioxaphospholanes of formula (II) above which can be used as starting materials according to the present invention, the following may be listed:

2-methoxy-1,3,2-dioxaphospholane
2-ethoxy-1,3,2-dioxaphospholane
2-isopropoxy-1,3,2-dioxaphospholane
2-n-butoxy-1,3,2-dioxaphospholane
2-dimethylamino-1,3,2-dioxaphospholane
2-diethylamino-1,3,2-dioxaphospholane
2-di-$\gamma$-allyl-amino-1,3,2-dioxaphospholane
2-diphenylamino-1,3,2-dioxaphospholane
2-(N-methyl-N-phenyl-amino)-1,3,2-dioxaphospholane
2-(4'-tert.-butyl-phenoxy)-1,3,2-dioxaphospholane
2-methylmercapto-1,3,2-dioxaphospholane
2-ethylmercapto-1,3,2-dioxaphospholane
2-n-butylmercapto-1,3,2-dioxaphospholane
2-phenylmercapto-1,3,2-dioxaphospholane
2-vinyloxy-1,3,2-dioxaphospholane
2-(1'-methyl-2'-ethoxycarbonyl)-vinyloxy-1,3,2-dioxaphospholane
2-methoxy-4-methyl-1,3,2-dioxaphospholane
2-methoxy-4-chloromethyl-1,3,2-dioxaphospholane
2-methoxy-4-bromomethyl-1,3,2-dioxaphospholane
2-methoxy-4-(methoxymethyl)-1,3,2-dioxaphospholane
2-methoxy-4-($\gamma$-allyloxy-methyl)-1,3,2-dioxaphospholane
2-ethylmercapto-4-chloromethyl-1,3,2-dioxaphospholane The compounds of formula (II) above are known and can be produced readily even on an industrial scale, as the artisan will appreciate.

Of course, in the same way, the bromodichloroacetaldehyde of formula (III) above is also well known and readily accessible.

The reaction according to the present invention may be carried out optionally in the presence of an inert solvent (this term includes a mere diluent), or mixtures of such solvents. All organic solvents inert to the reactants are suitable, including mixtures thereof, preferably aromatic hydrocarbons, especially $C_{6-10}$ aryl hydrocarbons, such as benzene, toluene, and the like; chlorinated aliphatic hydrocarbons, especially chlorinated lower aliphatic hydrocarbons, and more especially chlorinated lower (e.g. $C_{1-4}$ ) alkanes, such as di-, tri- and tetrachloromethane, and the like; ethers, especially aliphatic ethers, and more especially dilower alkyl (e.g. di $C_{1-4}$ alkyl) ethers, such as diethyl ether, and the like; and mixtures thereof. In principle, however, the reaction can be carried out without a solvent, if desired.

The reaction temperatures which may be used can be varied within a fairly wide range. In general, the reaction is carried out at from substantially between about 0°–100°C, and preferably from between about 30°–70°C. The instant reaction is exothermic, and the temperature can be regulated by the rate of addition of the aldehyde of formula (III) above.

For the carrying out of the production process according to the present invention, the desired 1,3,2-dioxaphospholane of formula (II) above may be optionally dissolved in one of the solvents mentioned above, and the equimolar amount of bromodichloroacetaldehyde of formula (III) above may be added dropwise thereto.

Preferably, approximately equimolar amounts of the two reactants are employed.

For working up the product, the reaction solutions are washed neutral, dried and concentrated. Many of the products (which are oils) so obtained can be purified by distillation. Where this is not possible because of the risk of decomposition, the oily crude products may be freed, under greatly reduced pressure, from residues of low-boiling components.

The compounds obtainable according to the production process of the present invention are, for the most part, new, and are usable as pesticides.

In this regard, in accordance with one specific embodiment, the present invention provides particular new 0-(2-bromo-ethyl)-0-(2,2-dichloro-vinyl)--phosphoric acid compounds of the formula

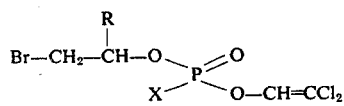
(I')

in which
R and X are the same as defined above, except that R is not hydrogen;
and preferably:
in which
R is alkyl of 1–4 or 1–3 or 1–2 carbon atoms, chloroalkyl of 1–4 or 1–3 or 1–2 carbon atoms, or alkenyloxy-alkyl having 2–5 or 2–4 or 3–4 carbon atoms in the alkenyloxy moiety and 1–4 or 1–3 or 1–2 carbon atoms in the alkyl moiety, and X is $C_{1-4}$ or $C_{1-3}$ or $C_{1-2}$ alkoxy, $C_{1-4}$ or $C_{1-3}$ or $C_{1-2}$ alkylmercapto, di-$C_{1-4}$ or $C_{1-3}$ or $C_{1-2}$ alkylamino, di-$C_{2-4}$ or $C_{3-4}$ or $C_3$ alkenyl-amino, or 1-($C_{1-4}$ or $C_{1-3}$ or $C_{1-2}$ alkyl)-2-(carbo-$C_{1-4}$ or $C_{1-3}$ or $C_{1-2}$ alkoxy)-vinyloxy;
and in particular:
in which
R is $C_{1-2}$ alkyl, chloro-$C_{1-2}$ alkyl, or $C_{2-4}$ alkenyl-oxymethyl, and
X is $C_{1-4}$ alkoxy.

Advantageously, the compounds of formula (Ia) above are distinguished by outstanding pesticidal, especially insecticidal, effectiveness. Moreover, such compounds possess only a low toxicity to warm-blooded animals and a concomitantly low phytotoxicity. The pesticidal effect sets in rapidly and is long-lasting. The compounds produced according to the present invention are therefore usable with success in crop protection endeavors to combat agricultural pests, e.g. for the control of noxious sucking and eating insects.

Classed with the biting insects contemplated herein are beetles (Coleoptera), for example the granary weevil (*Sitophilus granarius = Calandra granaria*), the Colorado beetle (*Leptino-tarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*) the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (Agriotes spec.) and larbae of the cockchafer (*Melolontha melolontha*); cockroaches, such as the German cockroach (*Blattella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds produced according to the instant invention may be employed alone or in the form of mixtures with one another and/or with such solid and/or liquid dispersible carrier vehicles and/or with other known compatible active agents, especially plant protection agents, such as other insecticides, or acaricides fungicides, nematicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.00001–20%, preferably 0.00001–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.00001–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing form about 20 to about 95% by weight of active compound or even the 100% active substance alone, e.g. about 20–100% by weight of the active compound.

Furthermore, the present invention contemplates methods of selectively killing, combating or controlling pests, e.g. insects, which comprise applying to at least one of (a) such insects and (b) their habitat, i.e. the locus to be protected, a correspondingly combative or toxic amount, i.e. an insecticidally effective amount, of the particular active compound according to the present invention alone or together with a carrier vehicle as noted above. The instant formulations or compositions are applied in the usual manner, for instance by spraying, atomizing, vaporizing, fumigating, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The insecticidal activity of the instant active compounds is illustrated, without limitation, by the following examples.

Example 1

$LT_{100}$ test for Diptera
Test creatures: *Aedes aegypti*
Solvent: Acetone 2 parts by weight of the particular active compound are dissolved in 1000 parts by volume of solvent, and the resulting solution is diluted with further solvent to the desired final lower concentration.

2.5 ml of the solution of the given active compound are pipetted into a Petri dish. On the bottom of the Petri dish a filter paper with a diameter of about 9.5 cm. is situated. The Petri dish remains uncovered until the solvent has completely evaporated. The amount of active compound per square meter of filter paper varies with the concentration of the solution of active compound used. About 25 test creatures are then placed in the Petri dish and such dish is covered with a glass lid.

The condition of the test creatures is continuously observed. The time which is necessary for a 100% knock down effect is determined.

The test creatures, the particular active compounds tested, their concentrations, and the periods of time at which there is a 100% knock down effect can be seen from the following Table 1.

Table 1

$LT_{100}$ test for Diptera

| Active compound | Concentrations of active compound in solution in % | $LT_{100}$ |
|---|---|---|
| ($2_1$) $\quad$ Br—CH$_2$—CH(CH$_3$)—O\\P(=O)(—OCH$_3$)—O—CH=CCl$_2$ | 0.2 | 60' |
|  | 0.02 | 60' |
|  | 0.002 | 60' |
|  | 0.0002 | 180' |

Table 1 – Continued $LT_{100}$ test for Diptera

| Active compound | Concentrations of active compound in solution in % | $LT_{100}$ |
|---|---|---|
| ($3_1$) Br—CH$_2$—CH(CH$_2$Cl)—O\\(CH$_3$O)/P(=O)—O—CH=CCl$_2$ | 0.2<br>0.02<br>0.002 | 60'<br>120'<br>180' |
| ($4_1$) Br—CH$_2$—CH$_2$—O\\(iC$_3$H$_7$—O)/P(=O)—O—CH=CCl$_2$ | 0.2<br>0.02 | 60'<br>120' |
| ($5_1$) Br—CH$_2$—CH$_2$—O\\(C$_2$H$_5$—S)/P(=O)—O—CH=CCl$_2$ | 0.2<br>0.02<br>0.002 | 60'<br>60'<br>180' |
| ($6_1$) Br—CH$_2$—CH$_2$—O\\((CH$_3$)$_2$N)/P(=O)—O—CH=CCl$_2$ | 0.2<br>0.02 | 60'<br>120' |

EXAMPLE 2

$LT_{100}$ test for Diptera
Test creatures: Musca domestica
Solvent: Acetone 2 parts by weight of the particular active compound are dissolved in 1000 parts by volume of solvent and the resulting solution is diluted with further solvent to the desired final lower concentration.

2.5 ml of the solution of the given active compound are pipetted into a Petri dish. On the bottom of the Petri dish a filter paper with a diameter of about 9.5 cm is situated. The Petri dish remains uncovered until the solvent has completely evaporated. The amount of active compound per square meter of filter paper varies with the concentration of the solution of active compound used. About 25 test creatures are then placed in the Petri dish and such dish is covered with a glass lid.

The condition of the test creatures is continuously observed. The time which is necessary for a 100% knock down effect is determined.

The test creatures, the particular active compounds tested, their concentrations, and the periods of time at which there is a 100% knock down effect can be seen from the following Table 2.

Table 2

$LT_{100}$ test for Diptera

| Active compound | Concentrations of active compound in solution in % | $LT_{100}$ |
|---|---|---|
| ($2_2$) Br—CH$_2$—CH(CH$_3$)—O\\(CH$_3$O)/P(=O)—O—CH=CCl$_2$ | 0.2<br>0.02<br>0.002 | 15'<br>40'<br>130' |
| ($3_2$) Br—CH$_2$—CH(CH$_2$Cl)—O\\(CH$_3$O)/P(=O)—O—CH=CCl$_2$ | 0.2<br>0.02<br>0.002 | 50'<br>50'<br>8$^h$ |
| ($4_2$) Br—CH$_2$—CH$_2$—O\\(i—C$_3$H$_7$—O)/P—OCH=CCl$_2$ | 0.2<br>0.02<br>0.002 | 30'<br>55'<br>8$^h$ |
| ($5_2$) Br—CH$_2$—CH$_2$—O\\(C$_2$H$_5$S)/P(=O)—O—CH=CCl$_2$ | 0.2<br>0.02<br>0.002 | 55'<br>3$^h$<br>8$^h$ |
| ($6_2$) Br—CH$_2$—CH$_2$—O\\((CH$_3$)$_2$N)/P(=O)—O—CH=CCl$_2$ | 0.2<br>0.02 | 75'<br>210' |

EXAMPLE 3

LD$_{100}$ test
Test creatures: Sitophilus granarius
Solvent: Acetone 2 parts by weight of the particular active compound are dissolved in 1000 parts by volume of the solvent, and the resulting solution is diluted with further solvent to the desired final concentration.

2.5 ml of the solution of the given active compound are pipetted into a Petri dish. On the bottom of the Petri dish a filter paper with a diameter of about 9.5 cm is situated. The Petri dish remains uncovered until the solvent has completely evaporated. The amount of active compound per square meter of filter paper varies with the concentration of the solution of active compound used. About 25 test creatures are then placed in the Petri dish and such dish is covered with a glass lid. The condition of the test creatures is observed after both 1 and 3 days from the commencement of the experiment. The knock down effect is determined as a percentage.

The particular active compounds tested, their concentrations, the test creatures and the results obtained can be seen from the following Table 3.

EXAMPLE 4

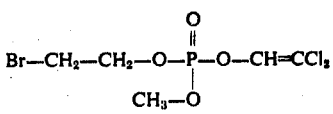

48 g (0.25 mol) bromodichloroacetaldehyde are added slowly, with stirring, to 30.5 g (0.25 mol) 2-methoxy-1,3,2-dioxaphospholane in 200 ml benzene. The temperature rises to 70°C. Stirring is continued for two to three hours, the temperature falling again to room temperature. The reaction mixture is washed neutral with water, dried over sodium sulfate, filtered off and concentrated. For purification, the oily residue can be distilled. 0-(2-bromo-ethyl)-0-(2,2-dichlorovinyl)-0-methyl-phosphoric acid ester is obtained in the form of a colorless oil of boiling point 110°C/0.01 mm Hg and having the refractive index $n_D^{25}$ = 1.4876.

Yield: 60.4 g (77.0% of the theory)

Table 3

LD$_{100}$ test

| Active compound | | Concentrations of active compound in solution in % | Destruction in % |
|---|---|---|---|
| (2$_3$) | Br—CH$_2$—CH(CH$_3$)—O, CH$_3$—O, P(=O)—O—CH=CCl$_2$ | 0.2<br>0.02<br>0.002<br>0.0002 | 100<br>100<br>100<br>50 |
| (3$_3$) | Br—CH$_2$—CH(CH$_2$—Cl)—O, CH$_3$—O, P(=O)—O—CH=CCl$_2$ | 0.2<br>0.02 | 100<br>100 |
| (4$_3$) | Br—CH$_2$—CH$_2$—O, i—C$_3$H$_7$—O, P(=O)—OCH=CCl$_2$ | 0.2 | 100 |
| (5$_3$) | Br—CH$_2$—CH$_2$—O, C$_2$H$_5$—S, P(=O)—O—CH=CCl$_2$ | 0.2<br>0.02 | 100<br>30 |
| (6$_3$) | Br—CH$_2$—CH$_2$—O, (CH$_3$)$_2$N, P(=O)—O—CH=CCl$_2$ | 0.2<br>0.02 | 100<br>90 |
| (7$_1$) | Br—CH$_2$—CH(CH$_2$—O—CH$_2$—CH=CH$_2$)—O, CH$_3$—O, P(=O)—O—CH=CCl$_2$ | 0.2<br>0.02 | 100<br>100 |

The following further examples are set forth to illustrate, without limitation, the manner of producing the instant active compounds according to the present invention.

Analysis:

| | P |
|---|---|
| Calculated for C$_5$H$_8$BrCl$_2$O$_4$P (313.9): | 9.88% |
| Found: | 9.77% |

EXAMPLE 5

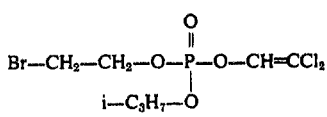 (4₄)

The above compound is prepared analogously to that of Example 4 from equimolar amounts of 2-isopropoxy-1,3,2-dioxaphospholane and bromodichloroacetaldehyde. 0-(2-bromoethyl)-0-(2,2-dichloro-vinyl)-0-isopropyl-phosphoric acid ester is obtained in the form of a colorless oil of boiling point 115°C/0.01 mm Hg and having the refractive index $n_D^{23}$ = 1.4773.

Yield: 72.5% of the theory.

| Analysis: | P |
|---|---|
| Calculated for $C_7H_{12}BrCl_2O_4P$ (342.0): | 9.07% |
| Found: | 9.27% |

EXAMPLE 6

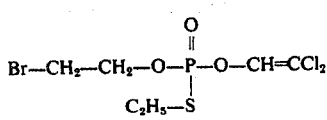 (5₄)

The above compound is prepared analogously to that of Example 4 from equimolar amounts of 2-ethylmercapto-1,3,2-dioxaphospholane and bromodichloroacetaldehyde. 0-(2-bromo-ethyl)-0-(2,2-dichloro-vinyl)-S-ethyl-thiolphosphoric acid ester is obtained in the form of a yellow oil of boiling point 140°C/0.3 mm Hg and having the refractive index $n_D^{23.5}$ = 1.5267.

Yield: 50.6% of the theory.

| Analysis: | P | S |
|---|---|---|
| Calculated for $C_6H_{10}BrCl_2O_3PS$ (344.0): | 9.02%; | 9.31%; |
| Found: | 9.23%; | 9.80%. |

EXAMPLE 7

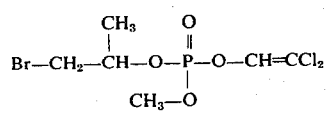 (2₄)

The above compound is prepared analogously to that of Example 4 from equimolar amounts of 2-methoxy-4-methyl-1,3,2-dioxaphospholane and bromodichloroacetaldehyde. 0-(2-bromo-1-methyl-ethyl)-0-(2,2-dichloro-vinyl)-0-methyl-phosphoric acid ester is obtained in the form of a colorless oil of boiling point 110°C/0.1 mm Hg and having the refractive index $n_D^{23.5}$ = 1.4839.

Yield: 37.1% of the theory.

| Analysis: | P |
|---|---|
| Calculated for $C_6H_{10}BrCl_2O_4P$ (328.0): | 9.45% |
| Found: | 9.56% |

EXAMPLE 8

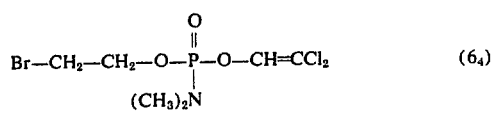 (6₄)

The above compound is prepared analogously to that of Example 4 from equimolar amounts of 2-dimethylamino-1,3,2-dioxaphospholane and bromodichloroacetaldehyde. 0-(2-bromoethyl)-0-(2,2-dichloro-vinyl)-phosphoric acid N,N-dimethylamide is obtained in the form of a colorless oil of boiling point 130°C/0.4 mm Hg and having the refractive index $n_D^{23.5}$ = 1.4951.

Yield: 56.4% of the theory.

| Analysis: | N | P |
|---|---|---|
| Calculated for $C_6H_{11}BrCl_2NO_3P$ (327.0): | 4.28%; | 9.48%; |
| Found: | 4.57%; | 9.57%. |

EXAMPLE 9

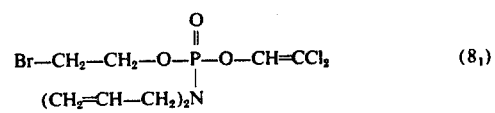 (8₁)

The above compound is prepared analogously to that of Example 4 from equimolar amounts of 2-di-γ-allylamino-1,3,2-dioxaphospholane and bromodichloroacetaldehyde. 0-(2-bromo-ethyl)-0-(2,2-dichloro-vinyl)-phosphoric acid N,N-di-γ-allyl-amide is obtained in the form of a colorless oil of boiling point 132°C/0.01 mm Hg and having the refractive index $n_D^{23.5}$ = 1.5021.

Yield: 56.0% of the theory.

| Analysis: | N | P |
|---|---|---|
| Calculated for $C_{10}H_{15}BrCl_2NO_3P$ (379.0): | 3.69%; | 8.17%; |
| Found: | 4.12%; | 8.04%. |

EXAMPLE 10

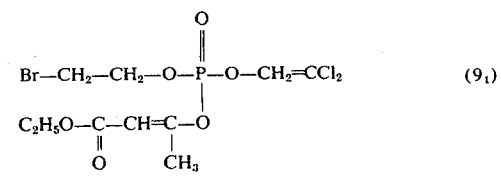 (9₁)

The above compound is prepared analogously to that of Example 4 from equimolar amounts of 2-(1'-methyl-2'-ethoxycarbonyl)-vinyloxy-1,3,2-dioxaphospholane and bromodichloroacetaldehyde. 0-(2-bromo-ethyl)-0-(2,2-dichloro-vinyl)-0-(1-methyl-2-carboethoxy)-vinyl-phosphoric acid ester is obtained in the form of a yellowish oil of boiling point 180°C/0.1 mm Hg, and having the refractive index $n_D^{26} = 1.4922$.

Yield: 4.2% of the theory.

| Analysis: | P |
|---|---|
| Calculated for $C_{10}H_{15}BrCl_2O_6P$ (413.0): | 7.53% |
| Found: | 7.61% |

EXAMPLE 11

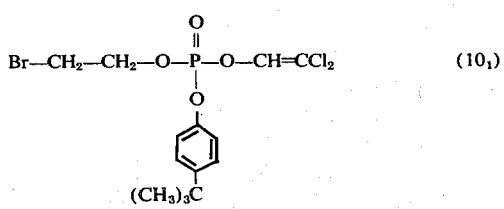

$(10_1)$

The above compound is prepared analogously to that of Example 4 from equimolar amounts of 2-(4'-tert.butyl-phenoxy)-1,3,2-dioxaphospholane and bromodichloroacetaldehyde, but stirring is effected at 50° to 60°C. 0-(2-bromo-ethyl)-0-(2,2-dichloro-vinyl)-0-(4'-tert.-butyl-phenyl)-phosphoric acid ester is obtained in the form of a yellowish oil having the refractive index $n_D^{23} = 1.5210$.

Yield: 44.7% of the theory.

| Analysis: | P |
|---|---|
| Calculated for $C_{14}H_{18}BrCl_2O_4P$ (431.1): | 7.18% |
| Found: | 6.44% |

EXAMPLE 12

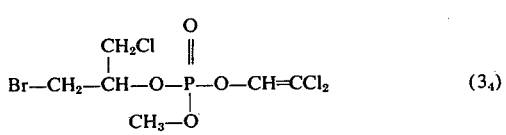

$(3_4)$

The above compound is prepared analogously to that of Example 4 from equimolar amounts of 2-methoxy-4-chloromethyl-1,3,2-dioxaphospholane and bromodichloroacetaldehyde. 0-(1-chloro-methyl-2-bromo-ethyl)-0-(2,2-dichloro-vinyl)-0-methyl-phosphoric acid ester is obtained in the form of a yellow oil having the refractive index $n_D^{21} = 1.5059$.

Yield: 26.1% of the theory.

| Analysis: | P |
|---|---|
| Calculated for $C_6H_9BrCl_3O_4P$ (362.4): | 8.53% |
| Found: | 9.01% |

EXAMPLE 13

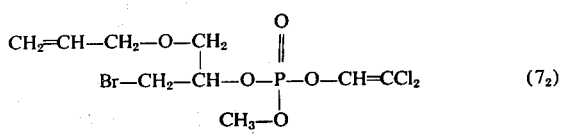

$(7_2)$

The above compound is prepared analogously to that of Example 4 from equimolar amounts of 2-methoxy-4-(γ-allyloxymethyl)-1,3,2-dioxaphospholane and bromodichloroacetaldehyde. 0-(1-γ-allyloxymethyl-2-bromo-ethyl)-0-(2,2-dichloro-vinyl)-0-methyl-phosphoric acid ester is obtained in the form of a yellow oil having the refractive index $n_D^{23} = 1.4909$.

Yield: 44.0% of the theory.

| Analysis: | P |
|---|---|
| Calculated for $C_9H_{14}BrCl_2O_5P$ (384.0): | 8.06% |
| Found: | 8.25% |

It will be realized by the artisan that all of the foregoing compounds contemplated by the present invention, i.e. produced by the instant process, possess the desired strong and selective pesticidal, e.g. insecticidal, properties for combating pests such as insects, as well as a comparatively low toxicity toward warm-blooded creatures and a concomitantly low phytotoxicity, enabling such compounds to be used with correspondingly favorable compatibility with respect to warm-blooded creatures and plants for more effective control and/or elimination of insects by application of such compounds to such insects and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. A method of combating the insect Sitophilus granarius, which comprises applying to said insect or its habitat an insecticidally effective amount of 0-(2-bromo-ethyl)-0-(2,2-dichlorovinyl)-0-methyl-phosphoric acid ester.

2. A method of combating the insect Aedes aegypti, which comprises applying to said insect or its habitat an insecticidally effective amount of 0-(2-bromo-ethyl)-0-(2,2-dichlorovinyl)-0-methyl-phosphoric acid ester.

3. A method of combatting the insect Trogoderma granarium, which comprises applying to said insect or its habitat an insecticidally effective amount of 0-(2-bromo-ethyl)-0-(2,2-dichlorovinyl)-0-methyl-phosphoric acid ester.

* * * * *